US 8,045,032 B2

(12) United States Patent
Muroshima et al.

(10) Patent No.: US 8,045,032 B2
(45) Date of Patent: Oct. 25, 2011

(54) SOLID-STATE IMAGING DEVICE HAVING A VOLTAGE CLIPPING CIRCUIT TO PREVENT IMAGE DEFECTS AND DRIVING METHOD THEREOF

(75) Inventors: Takahiro Muroshima, Kyoto (JP); Yasuyuki Endoh, Hyogo (JP); Masashi Murakami, Kyoto (JP)

(73) Assignee: Panasonic Corporation, Osaka (JP)

( * ) Notice: Subject to any disclaimer, the term of this patent is extended or adjusted under 35 U.S.C. 154(b) by 562 days.

(21) Appl. No.: 12/176,551

(22) Filed: Jul. 21, 2008

(65) Prior Publication Data

US 2009/0033782 A1 Feb. 5, 2009

(30) Foreign Application Priority Data

Jul. 31, 2007 (JP) ................. 2007-199954

(51) Int. Cl.
*H04N 3/14* (2006.01)
*H04N 5/335* (2006.01)
*H01L 27/00* (2006.01)
(52) U.S. Cl. ...................... 348/308; 348/300; 250/208.1
(58) Field of Classification Search .................. 348/300, 348/308, 257
See application file for complete search history.

(56) References Cited

U.S. PATENT DOCUMENTS

| | | | |
|---|---|---|---|
| 6,844,896 B2* | 1/2005 | Henderson et al. | 348/241 |
| 6,963,371 B2* | 11/2005 | Sakurai et al. | 348/301 |
| 7,141,775 B2 | 11/2006 | Koseki | |
| 7,394,055 B2* | 7/2008 | Koseki | 250/214 A |
| 7,432,493 B2* | 10/2008 | Koseki | 250/214 A |
| 7,528,871 B2* | 5/2009 | Masuyama et al. | 348/294 |
| 7,589,304 B2* | 9/2009 | Koseki | 250/208.1 |
| 7,601,939 B2* | 10/2009 | Koseki | 250/208.1 |
| 7,652,702 B2* | 1/2010 | Murakami et al. | 348/294 |
| 7,710,471 B2* | 5/2010 | Takayanagi | 348/243 |
| 7,723,661 B2* | 5/2010 | Hara et al. | 250/208.1 |
| 7,741,593 B2* | 6/2010 | Iwata et al. | 250/214 R |
| 7,808,537 B2* | 10/2010 | Fujimura et al. | 348/300 |
| 7,817,199 B2* | 10/2010 | Yamashita et al. | 348/308 |
| 7,852,385 B2* | 12/2010 | Mauritzson | 348/241 |

(Continued)

FOREIGN PATENT DOCUMENTS

JP 2005-252529 A 9/2005

(Continued)

OTHER PUBLICATIONS

English language Abstract of JP 2005-252529 A, Sep. 15, 2005.

(Continued)

*Primary Examiner* — John Villecco
(74) *Attorney, Agent, or Firm* — Greenblum & Bernstein, P.L.C.

(57) ABSTRACT

It is an object of the present invention to provide a solid-state imaging device capable of prevent image defects from appearing in an outputted image while suppressing increase in a layout area with a simple circuit structure and is an MOS solid-state imaging device. The MOS solid-state imaging device includes pixels which outputs signals corresponding to intensity of incident light, vertical signal lines which are respectively provided to columns of the pixels and each of which transmits the signals from said pixels in a column direction, and column amplifier circuits that amplify the signals from the pixels and are respectively connected to the vertical signal lines, and each of the column amplifier circuits includes a voltage clipping circuit includes a voltage clipping circuit which limits a maximum output voltage of said column amplifier circuit.

13 Claims, 14 Drawing Sheets

U.S. PATENT DOCUMENTS

| | | | |
|---|---|---|---|
| 2005/0194520 A1* | 9/2005 | Koseki | 250/214 AG |
| 2005/0253946 A1* | 11/2005 | Shinohara | 348/300 |
| 2006/0208158 A1 | 9/2006 | Masashi | |
| 2007/0069112 A1* | 3/2007 | Koseki | 250/208.1 |
| 2007/0146516 A1 | 6/2007 | Nezaki et al. | |
| 2007/0165117 A1* | 7/2007 | Toya et al. | 348/241 |
| 2008/0143863 A1* | 6/2008 | Masuyama et al. | 348/308 |
| 2008/0259193 A1* | 10/2008 | Toya et al. | 348/300 |
| 2009/0079849 A1* | 3/2009 | Kondo | 348/231.99 |
| 2009/0207290 A1* | 8/2009 | Kondo et al. | 348/302 |
| 2009/0284634 A1* | 11/2009 | Tsukimura | 348/308 |
| 2009/0295966 A1* | 12/2009 | Kubo et al. | 348/308 |
| 2009/0295968 A1* | 12/2009 | Matsuda et al. | 348/308 |
| 2009/0295970 A1* | 12/2009 | Fukuoka | 348/308 |
| 2010/0039543 A1* | 2/2010 | Muroshima et al. | 348/300 |
| 2010/0085448 A1* | 4/2010 | Fukuoka | 348/241 |
| 2010/0103302 A1* | 4/2010 | Kondo | 348/308 |
| 2010/0149366 A1* | 6/2010 | Noda et al. | 348/222.1 |
| 2010/0188539 A1* | 7/2010 | Kobayashi | 348/300 |
| 2010/0245642 A1* | 9/2010 | Toya et al. | 348/300 |
| 2010/0309356 A1* | 12/2010 | Ihara et al. | 348/300 |
| 2010/0328509 A1* | 12/2010 | Yamashita et al. | 348/300 |

FOREIGN PATENT DOCUMENTS

JP    2008199254 A   *   8/2008

OTHER PUBLICATIONS

U.S. Appl. No. 11/816,789 to Muroshima et al., which was filed on Aug. 21, 2007.

U.S. Appl. No. 11/718,556 to Nezaki et al., which was filed on May 3, 2007.

* cited by examiner

SOLID-STATE IMAGING DEVICE HAVING A VOLTAGE CLIPPING CIRCUIT TO PREVENT IMAGE DEFECTS AND DRIVING METHOD THEREOF

BACKGROUND OF THE INVENTION (1) Field of the Invention

The present invention relates to MOS solid-state imaging devices, and more particularly to a MOS solid-state imaging device having column amplifier circuits and a driving method of the solid-state imaging device.

(2) Description of the Related Art

In recent years, Metal Oxide Semiconductor (MOS) solid-state imaging devices, also known as amplifier-type solid-state imaging devices have been replacing Charge Coupled Device (CCD) solid-state imaging devices. While a CCD solid-state imaging device transfers signal charge Q generated and accumulated in photodiodes (PDs) to vertical and horizontal direction by a transfer pulse made up of multiple voltages, converts the charge into voltage (Q-V), and outputs by a floating diffusion amplifier (FDA) provided at an output terminal of the device, a general MOS solid-state imaging device performs Q-V conversion per pixel by providing the FDA for pixels, and performs column parallel reading out by a single power supply (read out pixel signals in each column in parallel).

Recently the MOS solid-state imaging device has become the mainstream since the MOS solid-state imaging device can be driven by a single power supply by providing an FDA for the pixels, does not require special manufacturing process as for CCD, an analog circuit and a digital circuit can be provided in the same chip, and thus image signal can be easily processed.

In addition, some of recent MOS solid-state imaging devices include column amplifier circuits for each column for amplifying pixel signals. A general MOS solid-state imaging device is provided with a coupled double sampling (CDS) circuit to remove fixed pattern noise (FPN) which is generated in the pixels per column, and an output amplifier circuit for amplifying and outputting the signals. Here, providing the column amplifier circuits enables signals to be amplified with respect to the FPN and random noise generated in these circuits, and a bandwidth can be restricted by column parallel process, high signal/noise ratio (S/N) can be realized.

FIG. 1 shows a block diagram of a general MOS solid-state imaging device including column amplifier circuits.

FIG. 1 shows that the MOS solid-state imaging device having column amplifier circuits includes: a pixel circuit (pixel array) 101 including plural pixels 101a arranged in a matrix; a vertical scanning circuit 102 which selects the pixels 101a per row; vertical signal lines 103 commonly connected to the pixels 101a in each column; and column amplifier circuits 104 each of which is connected to each of the vertical signal lines 103. The output of each of the column amplifier circuits 104 is connected to column CDS circuits 105, and output signals are sequentially read out to a horizontal common signal line 107 using selection signals from a horizontal scanning circuit 106. An output amplifier circuit 108 is connected to the horizontal common signal line 107, and the amplified output signals are outputted from the solid-state imaging device via the output amplifier circuit 108.

Next, FIG. 2 shows a circuit diagram of the pixel circuit 101 and the row amplifier circuit 104 of the general MOS solid-state imaging device including column amplifier circuits.

FIG. 2 shows that the pixel circuit 101 includes the pixel 101a, the vertical signal line 103 and a current source load transistor NM 104. The pixel 101a includes a photodiode (PD) 201 which generates signal charges according to incident light and accumulate the signal charges, and a floating diffusion (FD) 202 which accumulates the signal charges transferred from the PD 201. A charge transfer transistor NM102 is provided between the PD 201 and the FD 202, and a reset transistor NM101 is provided between the FD202 and the power supply signal line PIXPOW101. In addition, the gate of the charge transfer transistor NM102 is connected to a transfer signal line TR, and the gate of the reset transistor NM101 is connected to a reset signal line RS. The FD 202 is connected to the gate of the amplifier transistor NM103 connected between the vertical signal line 103 and the power supply signal line PIXPOW101. In addition, the amplifier transistor NM103 forms a source follower circuit along with the current supply load transistor NM104 connected to the vertical signal line 103, and outputs signal voltage corresponding to the signal voltage transferred from the PD 201 to the FD 202 to the vertical signal line 103. The column amplifier circuit 104 including a capacitance Cin 101, a common-source amplifier transistor NM 105, a resistance load transistor NM 107, and a clamp transistor NM 106 is connected to the vertical signal line 103.

Next, operations of the pixel circuit 101 and the column amplifier circuit 104 are explained with reference to the timing chart shown in FIG. 3.

First, at the timing between t1 and t2, the FD 202 in the pixel 101a is reset to the voltage of the power source signal line PIXPOW 101 via the reset transistor MN 101. At the same time, the column amplifier circuit 104 is reset by switching ON the clamp transistor NM 106 in the column amplifier circuit 104, and the clamp transistor NM 106 is switched OFF at timing t3. Subsequently, at the timing between t4 and t5, the signal charge Q accumulated in the PD 201 is transferred to the FD 202 by switching ON the charge transfer transistor NM 102 in the pixel circuit 101. With this, Q-V conversion is performed by the capacitance Cfd of the FD 202, and signal amplitude shown in the following formula is outputted to the vertical signal line 103 from the FD 202.

$$\frac{Q}{Cfd} \quad \text{[Formula 1]}$$

Here, a signal which is amplified by "A" times with respect to the output signal from the vertical signal line 103 as shown below is outputted as Vout from the column amplifier circuit 104.

$$A \times \frac{Q}{Cfd} \quad \text{[Formula 2]}$$

However, note that the gain of the source follower circuit is assumed to be 1.

Here, in a general solid-state imaging device including column amplifier circuits, since the power supply and the ground are supplied from a bonding pad provided at an end of a chip, each supply path more or less includes parasitic resistance Rvdd and Rgnd. Thus, when a single ended column amplifier as shown in FIG. 2 is provided, consumption current Iamp in the column amplifier circuit varies depending on the amplitude of the input signal to the column amplifier circuit as shown in FIG. 4. With this, the power source and ground voltage vary due to the parasitic resistance. There is a problem that, the variation in power supply voltage and the ground voltage in the column amplifier circuit appears as an output offset, an output offset is generated according to whether or not the signal of the high brightness object exists for the signals in other columns which has been read out simultaneously in parallel processing, and as shown in FIG. 5, the output offset appears in an output image as image defect such as a horizontal belt-like noise. In order to solve the problem, in Japanese Unexamined Patent Application Publication No. 2005-252529, a limiter transistor whose gate is connected to a limiter judging potential which judges output voltage of the amplifier, whose source is connected to the output of the amplifier, and whose drain is grounded is provided separately to a single ended switched capacitor amplifier (column amplifier circuit) in a column amplifier circuit in order to keep the consumption current of the column amplifier circuit at a constant value.

SUMMARY OF THE INVENTION

In Japanese Unexamined Patent Application Publication No. 2005-252529, a limiter transistor whose gate is connected to a limiter judging potential which judges output voltage of the amplifier, whose source is connected to the output of the amplifier, and whose drain is grounded is provided to a single ended switched capacitor amplifier separately in order to limit the output of the amplifier not to exceed a predetermined voltage. More specifically, controlling the operation of a limiter transistor by the potential difference Vgs between the gate and source of the limiter transistor to prevent the current source transistor of switched capacitor amplifier from the entering the non-saturated region so that variation in consumption current is suppressed.

However, in this configuration, a separate circuit for generating a limiter judging voltage to be applied to the gate of the limiter transistor is necessary, and an increase in the layout area for arranging the limiter judging voltage is concerned. Furthermore, variation in the setting value of the limiter judging voltage and Vth (threshold voltage) of the limiter transistor causes reduction of output voltage range from the column amplifier circuit.

In view of the problems above, it is an object of the present invention to provide a solid-state imaging device and its driving method capable of preventing image defect while suppressing the increase in layout area with a simple circuit structure.

In order to achieve the above object, the solid-state imaging device according to the present invention includes pixels which outputs signals corresponding to intensity of incident light, vertical signal lines which are respectively provided to columns of the pixels and each of which transmits the signals from the pixels in a column direction, and column amplifier circuits that amplify the signals from the pixels and are respectively connected to the vertical signal lines, and each of the column amplifier circuits includes a voltage clipping circuit which limits a maximum output voltage of said column amplifier circuit. Here, the column amplifier circuit may include a switched capacitor amplifier having an input capacitance, one terminal of which is connected to one of said vertical signal lines, a feedback capacitance arranged between the other terminal of said input capacitance and an output terminal of said column amplifier circuit, a first current source transistor whose drain is connected to the output terminal of said column amplifier circuit and whose source is connected to a constant potential, and an amplifier transistor whose drain is connected to the output terminal of said column amplifier circuit and whose source is grounded, in which the voltage clipping circuit comprises a MOS transistor whose source is connected to the output terminal of said column amplifier circuit, whose drain is connected to the gate of said amplifier transistor, and whose gate is connected to a reference potential.

With this, it is possible to limit the maximum output voltage of the column amplifier circuit by a switched capacitor amplifier having a voltage clipping circuit, not by the limiter transistor, to prevent variation in the power supply voltage and the ground voltage of the column amplifier circuit. Thus, it is possible to prevent image defects such as horizontal band-like noise without separately providing a circuit for generating a limiter judging voltage to be applied, in other words, limiting increase in the layout area with a simple circuit structure. Furthermore, with this structure, variation in the setting values of the limiter judging voltage and Vth (threshold voltage) of the limiter transistor does not cause reduction of output voltage range from the column amplifier circuit, and thus it is possible to use the maximum output voltage range of the column amplifier circuit.

According to the solid-state imaging device and driving method of the present invention, it is possible to solve a problem that an output offset is generated according to whether or not the signals of the high brightness object exist in other columns which have been read out simultaneously in parallel processing, and the output offset appears in an output image as image defect such as a horizontal belt-like noise with a simple circuit structure.

FURTHER INFORMATION ABOUT TECHNICAL BACKGROUND TO THIS APPLICATION

The disclosure of Japanese Patent Application No. 2007-199954 filed on Jul. 31, 2007 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

The solid-state imaging device and its driving method according to the embodiments of the present invention are hereinafter described with reference to the drawings.

First Embodiment

Figure 6:
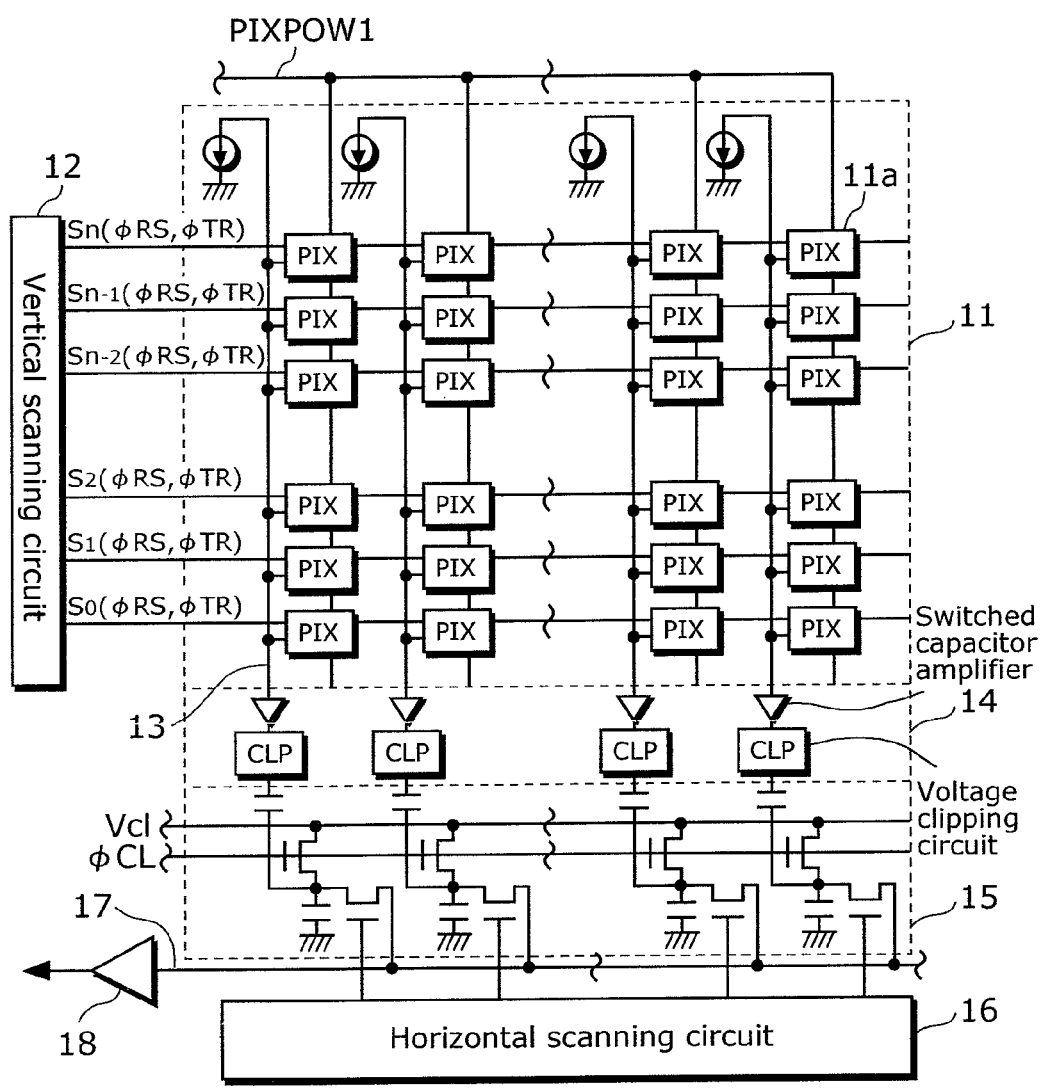
FIG. 6 is a block diagram showing a configuration of a solid-state imaging device according to the first embodiment of the present invention.

FIG. 6 is a block diagram showing a configuration of a MOS solid-state imaging device according to the first embodiment of the present invention.

As described in FIG. 6, the solid-state imaging device according to the present invention includes a pixel circuit (pixel array) 11 including pixels 11a each of which outputs signals corresponding to intensity of incident light, a vertical scanning circuit 12 which selects the pixels 11a per row, vertical signal lines 13 provided for each column of the pixels 11a and commonly connected to the pixels 11a in each column, column amplifier circuits 14 each of which is connected to each of the vertical signal lines 13 and is for amplifying signals from the pixels 11a, column CDS circuits 15, a horizontal scanning circuit 16, a horizontal common signal line 17, and an output amplifier circuit 18. The vertical signal lines 13 transmit signals outputted from the pixels 11a to the column direction. The output of the column amplifier circuit 14 which is configured of the voltage clipping circuit and the switched capacitor amplifier is connected to the column CDS circuit 15, and output signals are sequentially read out to the horizontal common signal line 17 using selection signals from the horizontal scanning circuit 16. The output amplifier circuit 18 is connected to the horizontal common signal line 17, and the amplified output signals are outputted from the solid-state imaging device.

Figure 7:
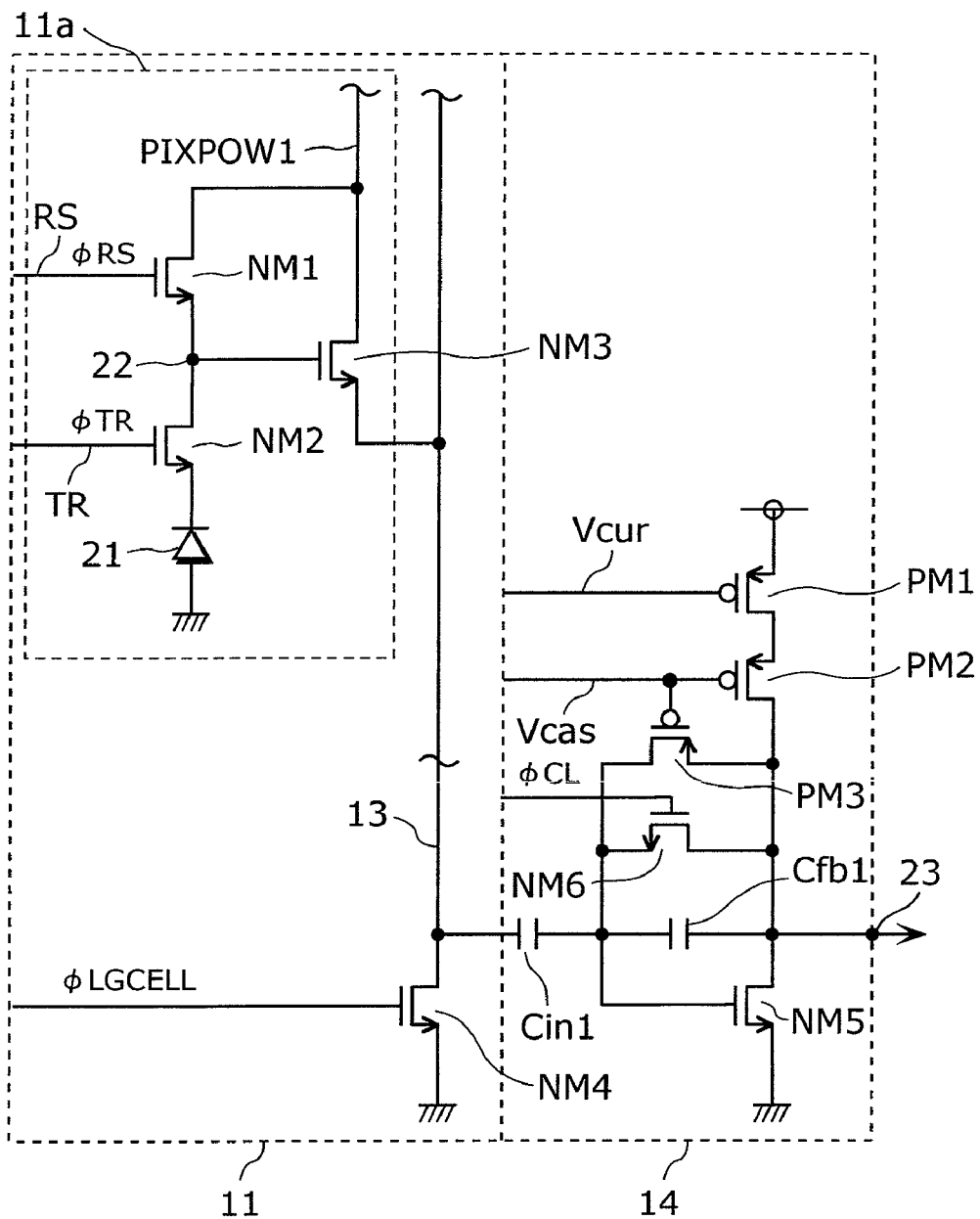
FIG. 7 is a circuit diagram showing detailed structures of a pixel circuit and a column amplifier circuit of the solid-state imaging device according to the first embodiment.

FIG. 7 is a circuit diagram showing detailed structures of the pixel circuit 11 and the column amplifier circuit 14 according to the first embodiment. Note that the vertical signal lines 13 corresponding to the columns of the pixels 11a, more specifically, the same number of vertical signal lines 13 as the number of vertical scanning lines are provided to the pixel circuit 11, and the pixels 11a are connected in parallel to one vertical signal line 13. However, for the simplicity of circuit diagram, only one vertical signal line 13 and a pixel 11a for one pixel and one column amplifier circuit 14 connected to the pixel 11a are illustrated in the diagram.

FIG. 7 shows that the pixel circuit 11 includes the pixel 11a, the vertical signal line 13 and the current source load transistor NM4. Furthermore, the pixel 11a includes a photodiode (PD) 21 which generates signal charges according to intensity of incident light and accumulate the signal charges, and a floating diffusion (FD) 22 which accumulates the signal charges transferred from the PD 21. A transfer transistor NM2 is provided between the PD 21 and the FD 22, and a reset transistor NM1 is provided between the FD 22 and the power source signal line PIXPOW1. In addition, the gate of the transfer transistor NM2 is connected to a transfer signal line TR, and the gate of the reset transistor NM1 is connected to a reset signal line RS. The FD 22 is connected to the gate of the amplifier transistor NM3 connected between the vertical signal line 13 and the power supply signal line PIXPOW1. In addition, the amplifier transistor NM3 forms a source follower circuit along with the current supply load transistor NM4 connected to the vertical signal line 13, and outputs signal voltage corresponding to the signal charge transferred from the PD 21 to the FD 22 to the vertical signal line 13. The column amplifier circuit 14 including: an input capacitance Cin1 having a capacitance value Cin; a feedback capacitance Cfb1 having a capacitance value Cfb; a common source amplifier transistor NM5; a current source transistor PM1; a cascade (shield) transistor PM2; a clamp transistor NM6; and a clipping transistor PM3 is connected to the vertical signal line 13. The clipping transistor PM3 is an example of voltage clipping circuit according to the present invention, and is a MOS transistor which limits the maximum output voltage of the column amplifier circuit 14. The circuit which includes the input capacitance Cin1, the feedback capacitance Cfb1, the common-source amplifier transistor NM5, the current source transistor PM1, and the cascade transistor PM2 is an example of the switched capacitor amplifier according to the present invention.

A terminal on one end of the input capacitance Cin1 is connected to the vertical signal line 13. The feedback capacitance Cfb1 is inserted between the terminal on the other end of the input capacitance Cin1 and the output terminal 23 of the column amplifier circuit 14. The cascode transistor PM2 is an example of the first current source transistor according to the present invention, and its drain is connected to the output terminal 23 of the column amplifier circuit 14. The current source transistor PM1 is an example of a second current source transistor according to the present invention, and is connected with the cascode transistor PM2 in cascode connection, its drain is connected to the source of the cascode transistor PM2, and its source is connected to a constant potential (power source). In the common-source amplifier transistor NM5, the drain is connected to the output terminal 23 of the column amplifier circuit 14 and the source is grounded. In the clipping transistor PM3, the source is connected to the output terminal 23 of the column amplifier circuit 14, the drain is connected to the gate of the common-source amplifier transistor NM5, and the gate is connected to the signal line Vcas.

Here, the signal lines Vcur and Vcas are respectively connected to the gates of the current source transistor PM1 and the cascode transistor PM2, and reference voltages Vcur and Vcas are respectively applied. Both transistors operate in saturation region. Furthermore, the signal line Vcas connected to the gate of the cascode transistor PM2 is connected, and is connected to the gate of the clipping transistor PM3 and the reference voltage Vcas is applied. The closed loop gain Ac of the column amplifier circuit 14 can be represented as follows using parasitic capacitance Cp of the gate of the common-source amplifier transistor NM5 and the open loop gain A0.

$$Ac = \frac{Cin}{\left(Cfb + \frac{Cin + Cfb + Cp}{A_0}\right)} \quad \text{[Formula 3]}$$

When the open loop gain A0 is infinite, the closed loop gain Ac is represented as follows.

$$Ac = \frac{Cin}{Cfb} \quad \text{[Formula 4]}$$

As described above, the solid-state imaging device shown in FIGS. 6 and 7 according to the first embodiment includes the column amplifier circuit 14 configured of a single ended switched capacitor amplifier and the clipping transistor PM3. In addition, the solid-state imaging device is configured in such a manner that the gate of the clipping transistor PM3 is connected to the gate of the cascode transistor PM2 of the switched capacitor amplifier.

In the solid-state imaging device having the configuration described above, first, signals correspond to the intensity of incident light from the selected pixels 11a among the pixels 11a arranged in matrix are outputted to the vertical signal lines 13 provided corresponding to the columns of the pixels 11a. Next, the signals outputted to the vertical signal lines 13 are amplified by the column amplifier circuits 14 respectively connected to the vertical signal lines 13, and are outputted to the horizontal common signal line 17. For the signals outputted from the column amplifier circuit 14, the maximum output voltage is limited by the clipping transistor PM3 provided in the column amplifier circuits 14.

Next, the driving method of the solid-state imaging device according to the first embodiment is described with reference to the drawings.

Figure 8:
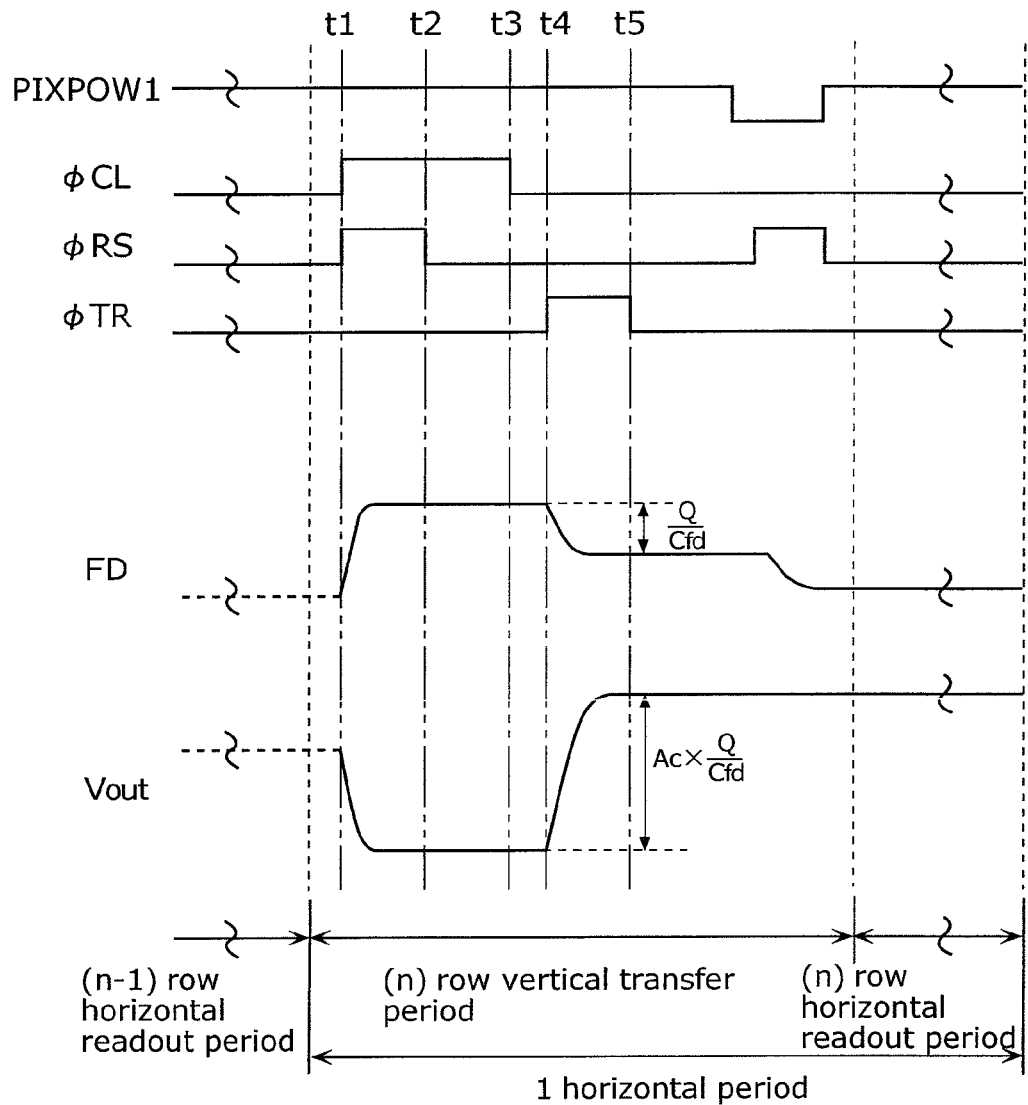
FIG. 8 is timing chart showing operations of the pixel circuit and the column amplifier circuit of the solid-state imaging device according to the first embodiment.

FIG. 8 is a timing chart showing operations of the pixel circuit 11 and the column amplifier circuit 14 of the solid-state imaging device according to the first embodiment.

First, at timing between t1 and t2, the FD 22 in the pixel circuit 11 is reset to the voltage of the power source signal line PIXPOW1 via the reset transistor NM1. At the same time, the clamp transistor NM6 in the column amplifier circuit 14 is switched on to reset the column amplifier circuit 14. Next, at timing t3, the reset is released by switching off the clamp transistor NM6.

Next, at timing between t4 and t5, the transfer transistor NM2 in the pixel circuit 11 is switched on to transfer the signal charge Q accumulated in the PD 21 to the FD 22. The signal charge Q is Q-V converted by the capacitance Cfd in the FD 22, and the following signal amplitude is outputted to the vertical signal line 13.

$$\frac{Q}{Cfd} \quad \text{[Formula 5]}$$

The column amplifier circuit 14 outputs the signal whose amplitude has been amplified by Ac times with respect to the output signal from the vertical signal line 13.

$$Ac \times \frac{Q}{Cfd} \quad \text{[Formula 6]}$$

Note that the gain in the source follower circuit formed when outputting signals from the pixel 11a is assumed to be 1.

Figure 9:
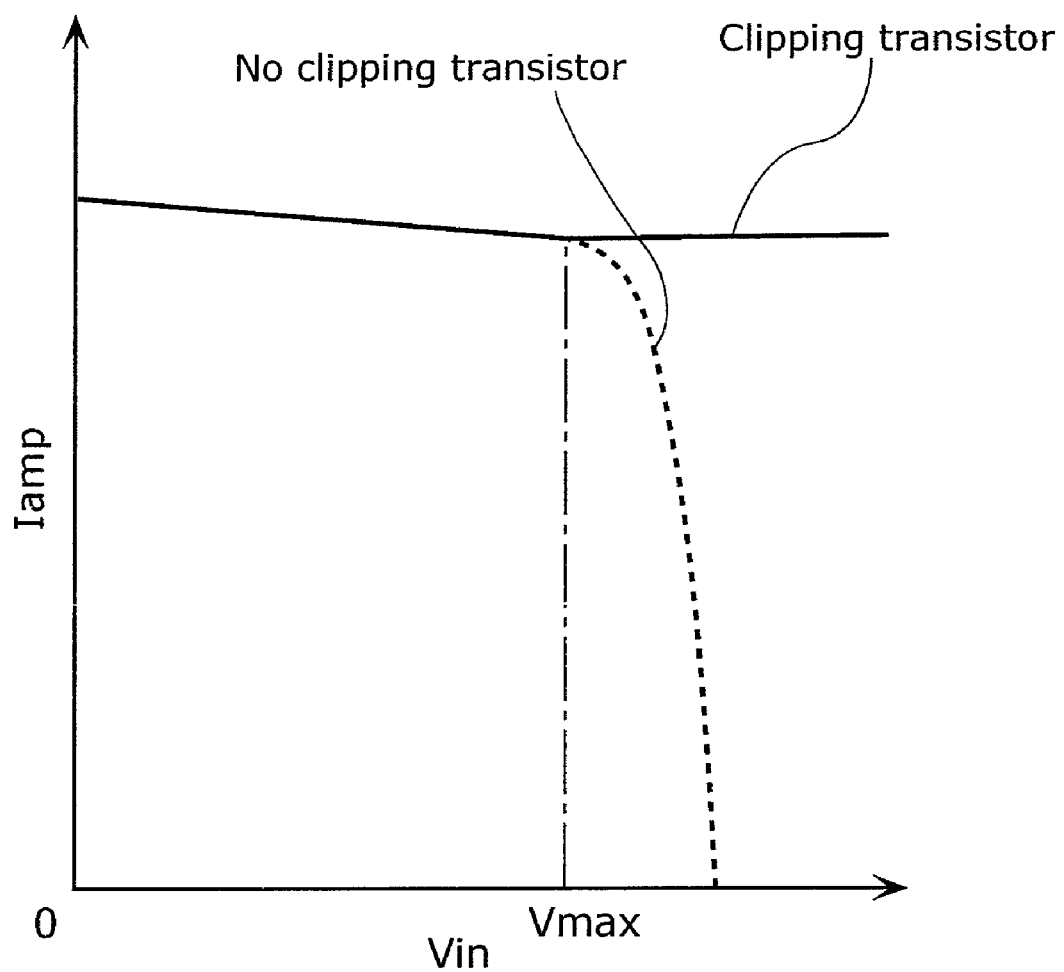
FIG. 9 is a chart showing a relationship between signal amplitude of input signal to the column amplifier circuit and consumption current of the column amplifier circuit in the solid-state imaging device according to the first embodiment.

Next, the voltage clipping unit in the column amplifier circuit 14 is described with reference to FIG. 9. FIG. 9 is a chart showing a relationship between the signal amplitude Vin of the input signal and the consumption current Iamp in the column amplifier circuit 14. Note that, in FIG. 9, the broken line indicates a relationship between the signal amplitude Vin and the consumption current Iamp in a column amplifier circuit which does not have the clipping transistor PM3, while the solid line indicates the relationship between the signal amplitude Vin and the consumption current Iamp in the column amplifier circuit 14 having the clipping transistor PM3.

As shown in FIG. 9, when there is no clipping transistor PM3, the consumption current drastically falls when a signal having signal amplitude larger than the signal amplitude Vmax is inputted to the column amplifier circuit. This is due to, as described above, the operation of the current source transistor PM1 in the non-saturation region. Thus, in the solid-state imaging device according to the first embodiment, the consumption current shown in the solid line can be achieved by adding the clipping transistor PM3.

Here, the operation condition for the current source transistor PM1 in the saturation region is similar to the operation condition for the cascode transistor PM2 in consideration of maximizing the output voltage range, and when the output voltage Vout of the column amplifier circuit satisfies the following using the threshold voltage Vtp of the cascode transistor PM2.

$$Vout \leq Vcas - Vtp \quad \text{[Formula 7]}$$

Here, when the output voltage Vout is represented as follows with an application of Vcas, which is the gate voltage of the cascode transistor PM2 to the gate of the clipping transistor PM3, and $$Vout > Vcas - Vtp \quad \text{[Formula 8]}$$

the potential difference Vgs between the gate and the source of the clipping transistor PM3 is represented as $$|Vcas - Vout| > |Vtp| \quad \text{[Formula 9]}$$

and the clipping transistor PM3 is conducted for the first time, and resistance is fed back to the column amplifier circuit.

Thus, in the solid-state imaging device according to the present invention, it is possible to suppress variation in the consumption current in the column amplifier circuit since the output voltage Vout is no more than Vcas−Vtp with the resistance feedback of the clipping transistor PM3, and the current source transistor PM1 does not enter the non-saturation region.

As described above, according to the solid-state imaging device in the first embodiment, a constant current column amplifier circuit can be realized without using a limiter transistor as in the conventional solid-state imaging device. More specifically, it is possible to realize the constant current column amplifier circuit capable of using the maximum output voltage range of the amplifier circuit while suppressing the increase in the layout area with a simple circuit structure. As a result, it is possible to suppress the horizontal belt-like noise that is generated according to whether or not the signal of the high brightness object exist in other columns which has been read out simultaneously in parallel processing, without causing a new problem.

Figure 1:
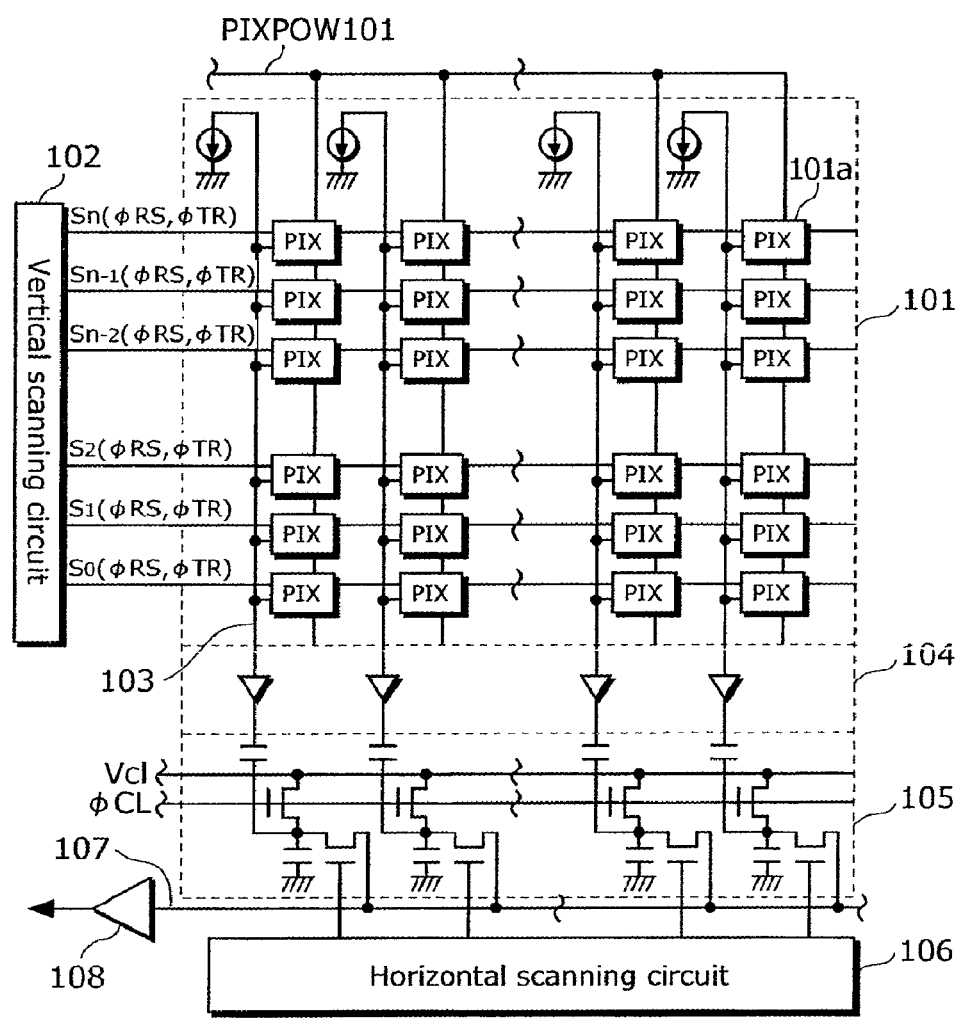
FIG. 1 is a block diagram showing a general solid-state imaging device having a column amplifier circuit.
Figure 2:
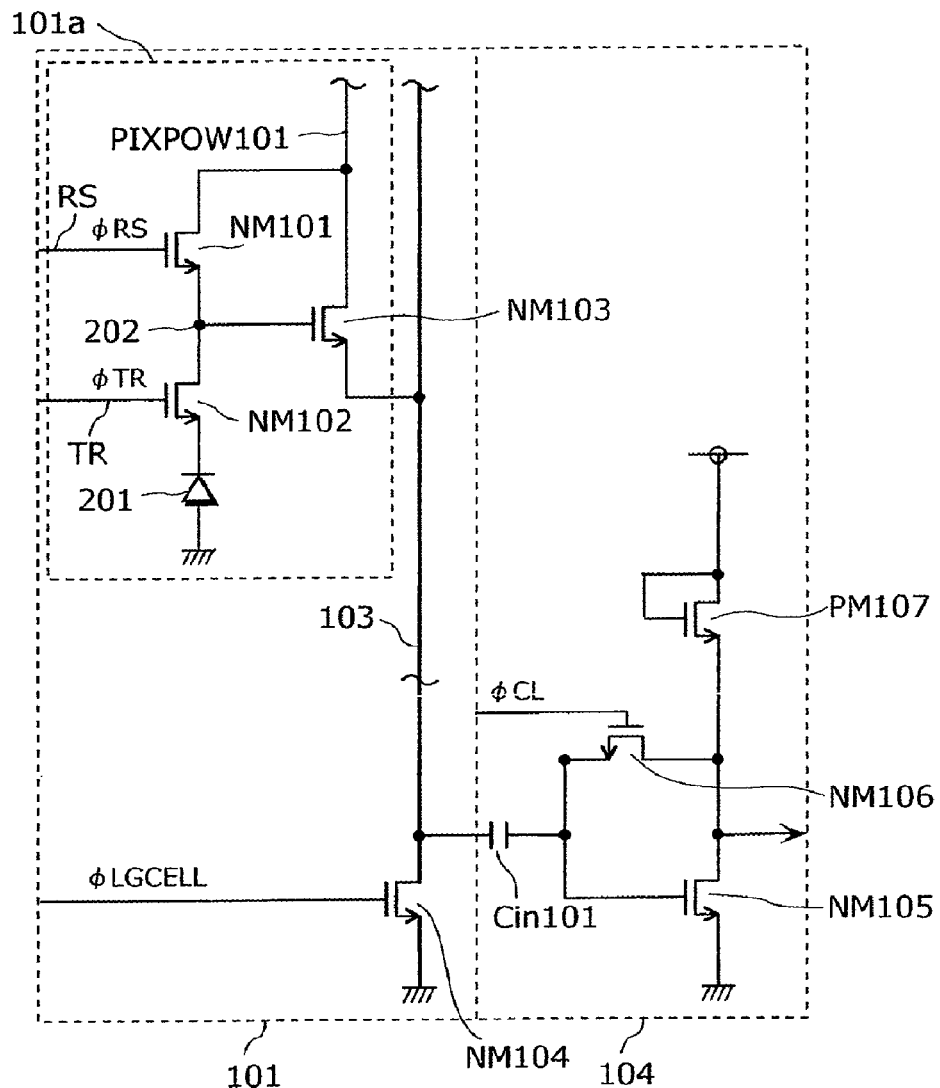
FIG. 2 is a circuit diagram showing structures of a pixel circuit and a column amplifier circuit of the general solid-state imaging device having a column amplifier circuit.
Figure 3:
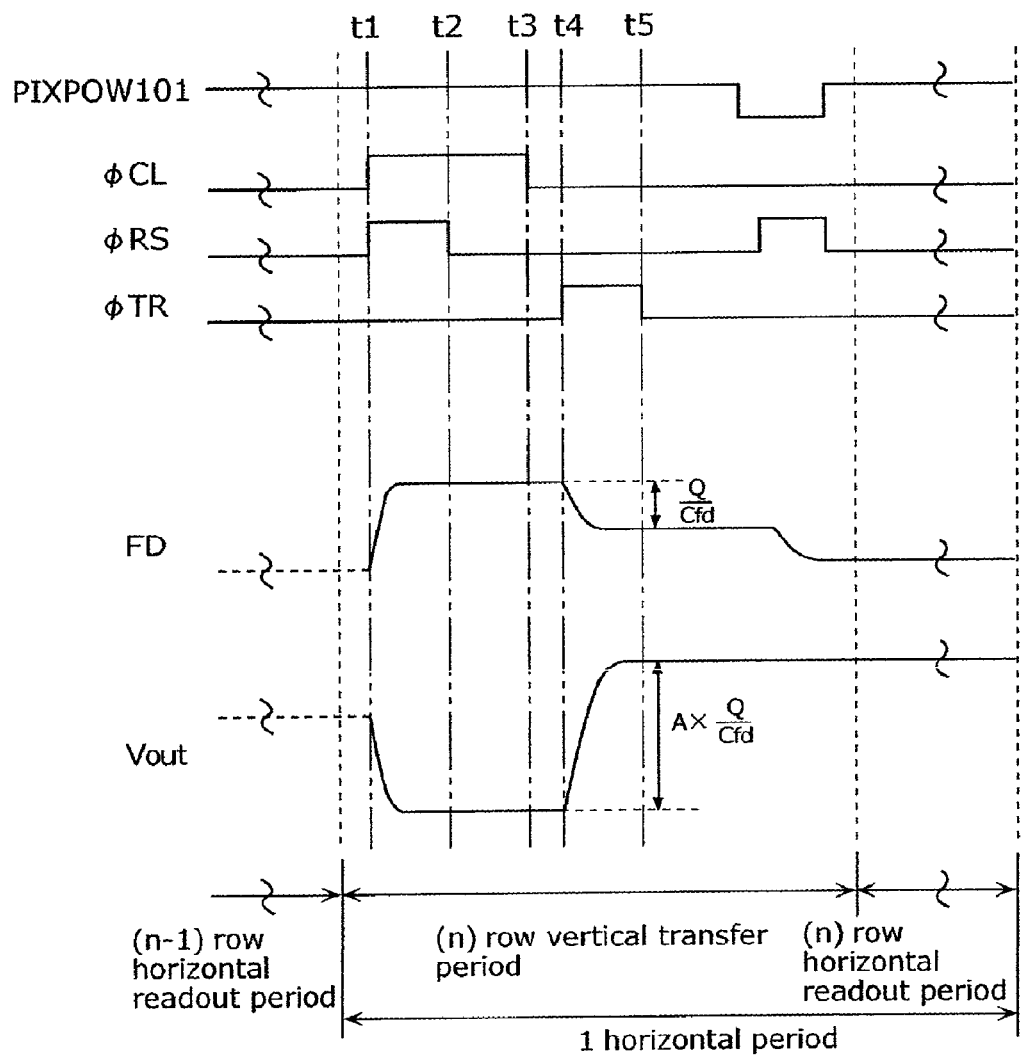
FIG. 3 is a timing chart showing operations of the pixel circuit and the column amplifier circuit of the general solid-state imaging device having the column amplifier circuit.
Figure 4:
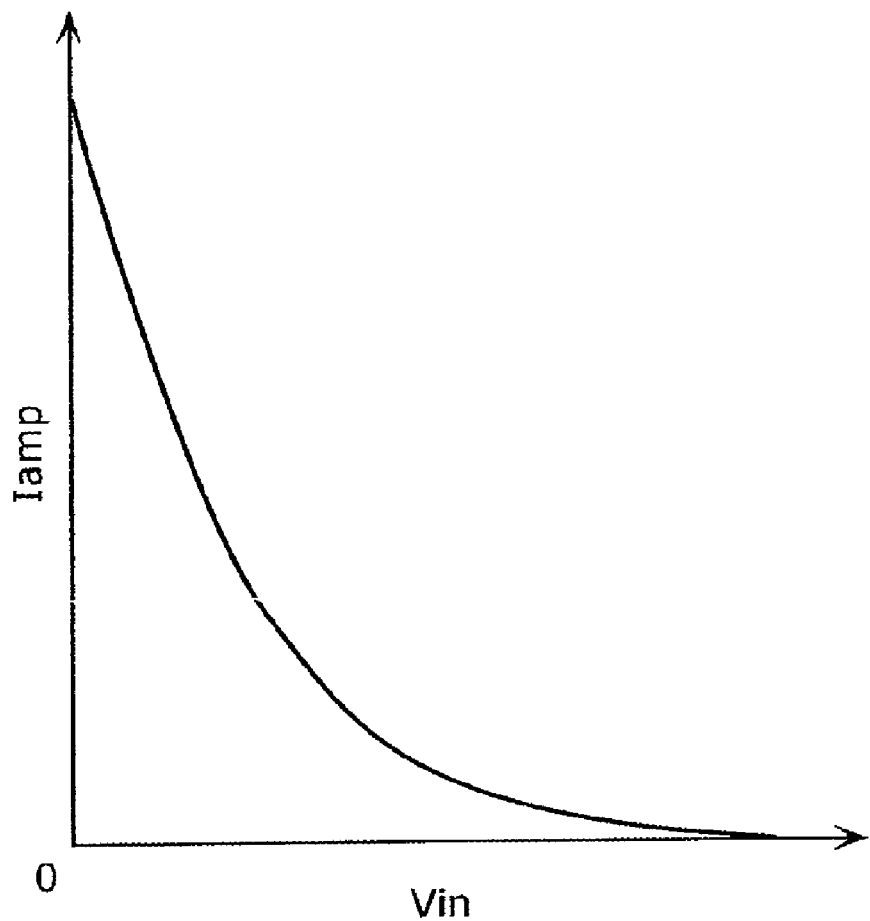
FIG. 4 is a chart showing a relationship between signal amplitude of input signal to the column amplifier circuit and consumption current of the column amplifier circuit.
Figure 5:
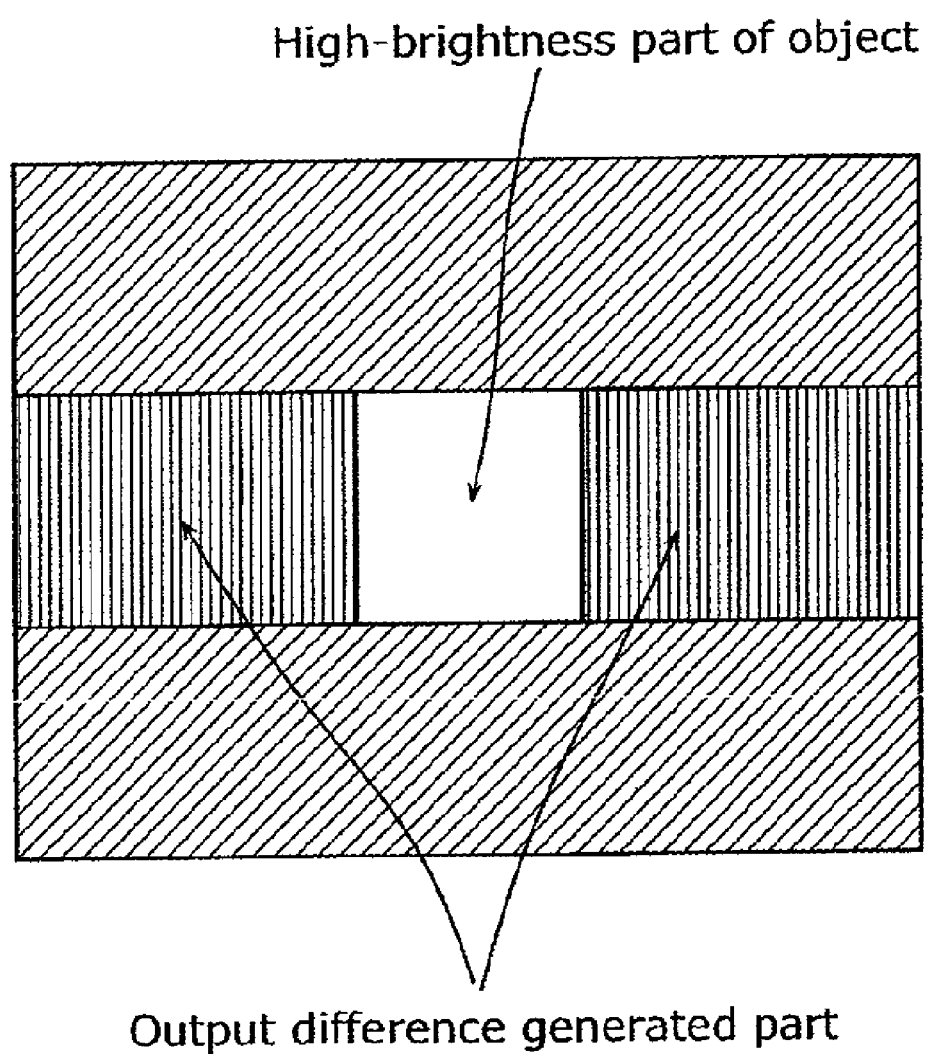
FIG. 5 is a diagram showing an example of an output image with horizontal belt-like noise.

Furthermore, the solid-state imaging device according to the first embodiment is described in detail using the comparison technique shown in FIG. 10 and FIGS. 2 to 5. A general MOS solid-state imaging device has a layout that the power source and the ground wiring of the column amplifier circuit are wired from a bonding pad provided at the end of chip, and thus the respective supply paths include parasitic resistance Rvdd and Rgnd. When the single ended column amplifier circuit 104 is provided thereon for each column, as shown in FIG. 2, the consumption current of the column amplifier circuit 104 varies (see FIG. 4) by the signal amplitude of the input signal in the column amplifier circuit 104 (the amplitude of the output signal in the pixel 101a), and the amount of IR drop caused by the parasitic resistance Rvdd and Rgnd varies. As a result, the variation in the consumption current appears in the output of the column amplifier circuit 104 as a variation of the power source voltage and the ground voltage. Thus, there is a problem that, when there is the signals of a high brightness object in other rows and columns to be read out in the column parallel processing, output offset is generated and the horizontal belt-like noise appears in the outputted image (see FIG. 5).

In order to suppress the influence of the power source and the ground wiring, a technique to provide a switched capacitor amplifier which maintains a constant consumption current in a column amplifier circuit at a constant value is possible. Configurations using a differential amplifier circuit and a single ended circuit are possible for a switched capacitor amplifier; however, it is preferable to use a single ended switched capacitor amplifier (switched capacitor amplifier using the single ended circuit) considering the layout area, the output voltage range and the complexity of circuit structure.

Figure 10:
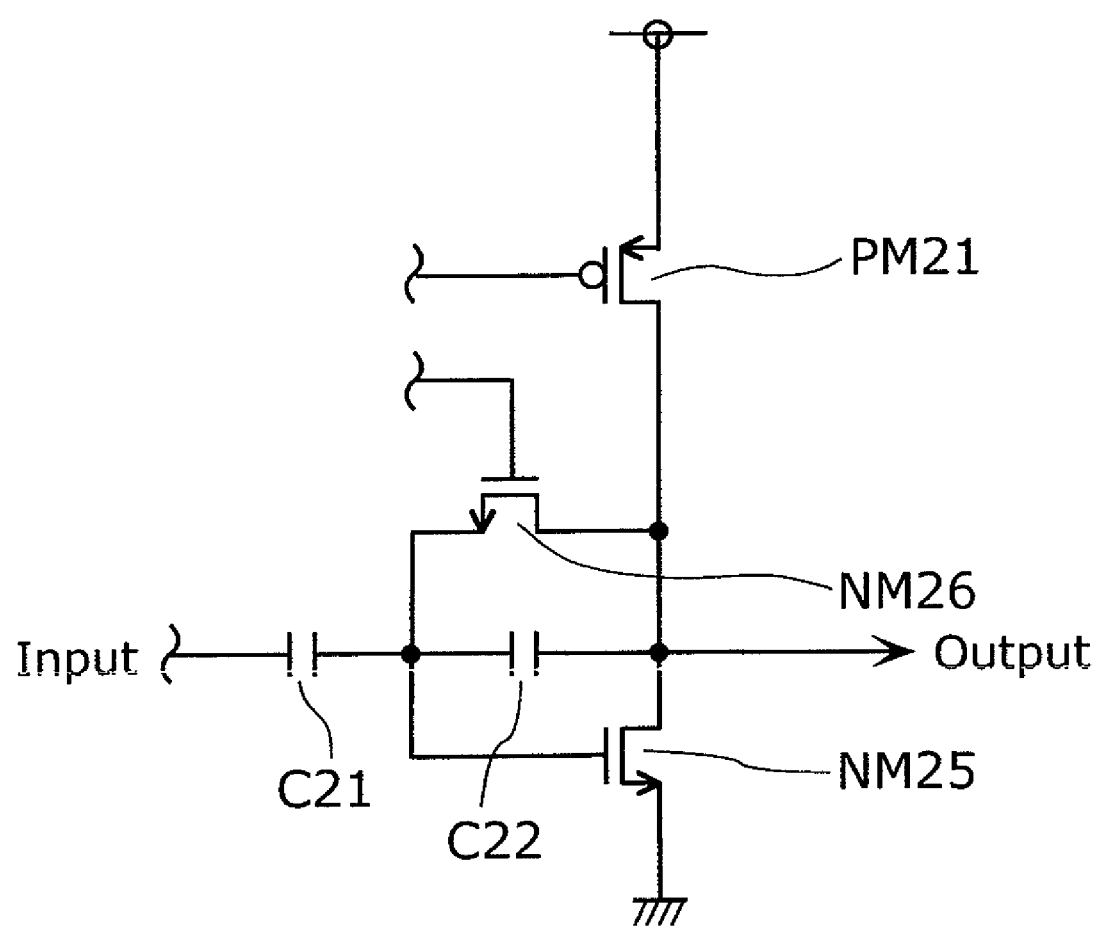
FIG. 10 is a circuit diagram showing a structure of a general single-ended switched capacitor amplifier.

FIG. 10 is a circuit diagram of a general single ended switched capacitor amplifier. The switched capacitor amplifier includes a constant current source transistor PM21, a clamp transistor NM26, a common-source amplifier transistor NM25, an input capacitance C21, and a feedback capacitance C22. In the solid-state imaging device using the single ended switched capacitor amplifier, the consumption current can be maintained at a constant value. Thus, it is possible to suppress the horizontal belt-like noise caused by the variations in the power source and the ground voltage.

Meanwhile, in the single ended switched capacitor amplifier, increase of the output voltage of the amplifier reduces the voltage between the drain and the source of the constant current source transistor PM21, and the operation region of the transistor enters the non-saturation region from the saturation region. With this, it is possible to maintain the constant consumption current. To put it differently, simply using the switched capacitor amplifier shown in FIG. 10 causes another problem such as reduction in consumption current when a signal higher than certain signal amplitude is inputted.

In order to prevent the problem, the solid-state imaging device according to the first embodiment uses a single ended switched capacitor amplifier in combination with the clipped transistor in a column amplifier circuit, instead of simply using the single ended switched capacitor amplifier. With this, the solid-state imaging device according to the present invention does not require a configuration used for a conventional solid-state imaging device, in which the operation of the limiter transistor is controlled by the potential difference Vgs between the gate and the source of the limiter transistor so that the current source transistor does not enter the non saturation region. More specifically, the solid-state imaging device does not require a configuration that restricts the output of the amplifier by separately providing a limiter transistor, whose gate is connected to the limiter judging potential for judging the output voltage of the amplifier, whose source is connected to the output of the amplifier, and whose drain is grounded, so that the output of the amplifier is limited and does not to exceed a certain voltage. Therefore, in this configuration, a separate circuit for generating a limiter judging voltage to be applied to the gate of the limiter transistor is not necessary, and an increase in the layout area for wiring the limiter judging voltage is prevented, and furthermore, reduction in the output voltage range of the amplifier caused by the variations in the setting value of the limiter judging voltage and Vth (threshold voltage) of the limiter transistor.

Note that, in the solid-state imaging device according to the first embodiment, the cascode transistor PM2 is configured in one stage, and thus the same voltage as the gate of the cascode transistor PM2 is applied to the gate of the clipping transistor PM3. However, when the current source cascode transistors are arranged in multiple stages, it is preferable to apply the gate voltage of the cascode transistor provided closest to the side of output of the column amplifier circuit 14 (the cascode transistor whose drain is connected to the output terminal 23) to the gate voltage of the clipping transistor PM3.

Furthermore, the solid-state imaging device according to the first embodiment is configured to judge whether the output voltage of the column amplifier circuit 14 is to be clipped or not by the clipping transistor PM3 at Vgs (gate-source voltage) as described above. Thus, Vth (threshold voltage) in the cascode transistor PM2 needs to be matched with Vth (threshold voltage) in the clipping transistor PM3. Therefore, in consideration of variations in manufacturing of transistors, it is preferable that the gate width and the gate length of the clipping transistor PM3 to match the gate width and the gate length of the cascode transistor PM2 respectively, that the clipping transistor PM3 is arranged next to the cascode transistor PM2 as close as possible and in such a manner that the layout direction (channel direction) matches.

Figure 11A:
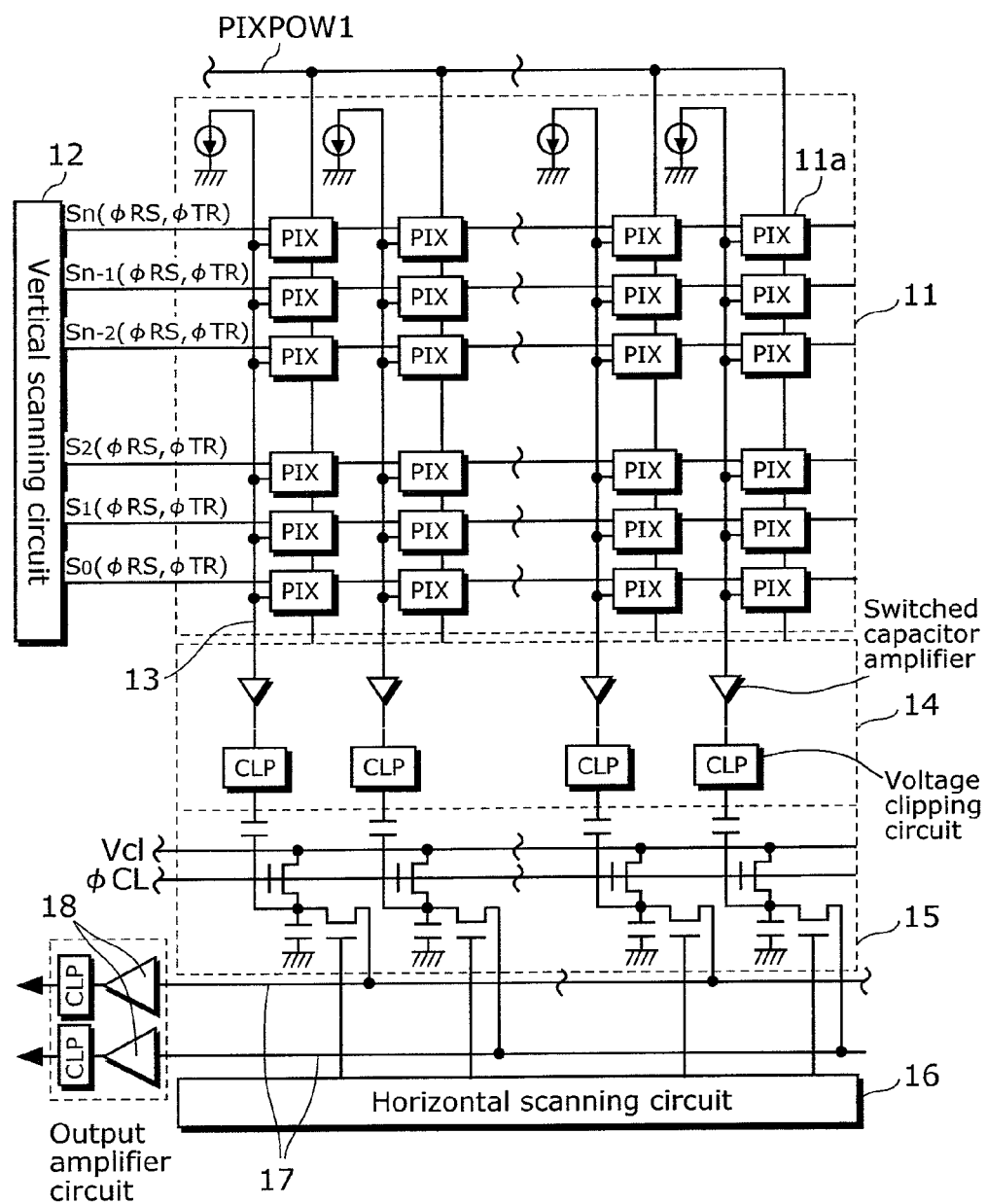
FIG. 11A is a block diagram showing a variation configuration of a variation of a solid-state imaging device according to the first embodiment.

Furthermore, as shown in the block diagram in FIG. 11A, when there are multiple amplifier circuits each of which configured of single ended switched capacitor amplifier, each output amplifier circuit may include a voltage clipping circuit. In this case, the offset output generated in one output amplifier circuit 18 due to the variation in current in the other output amplifier circuit 18 can be suppressed.

Figure 11B:
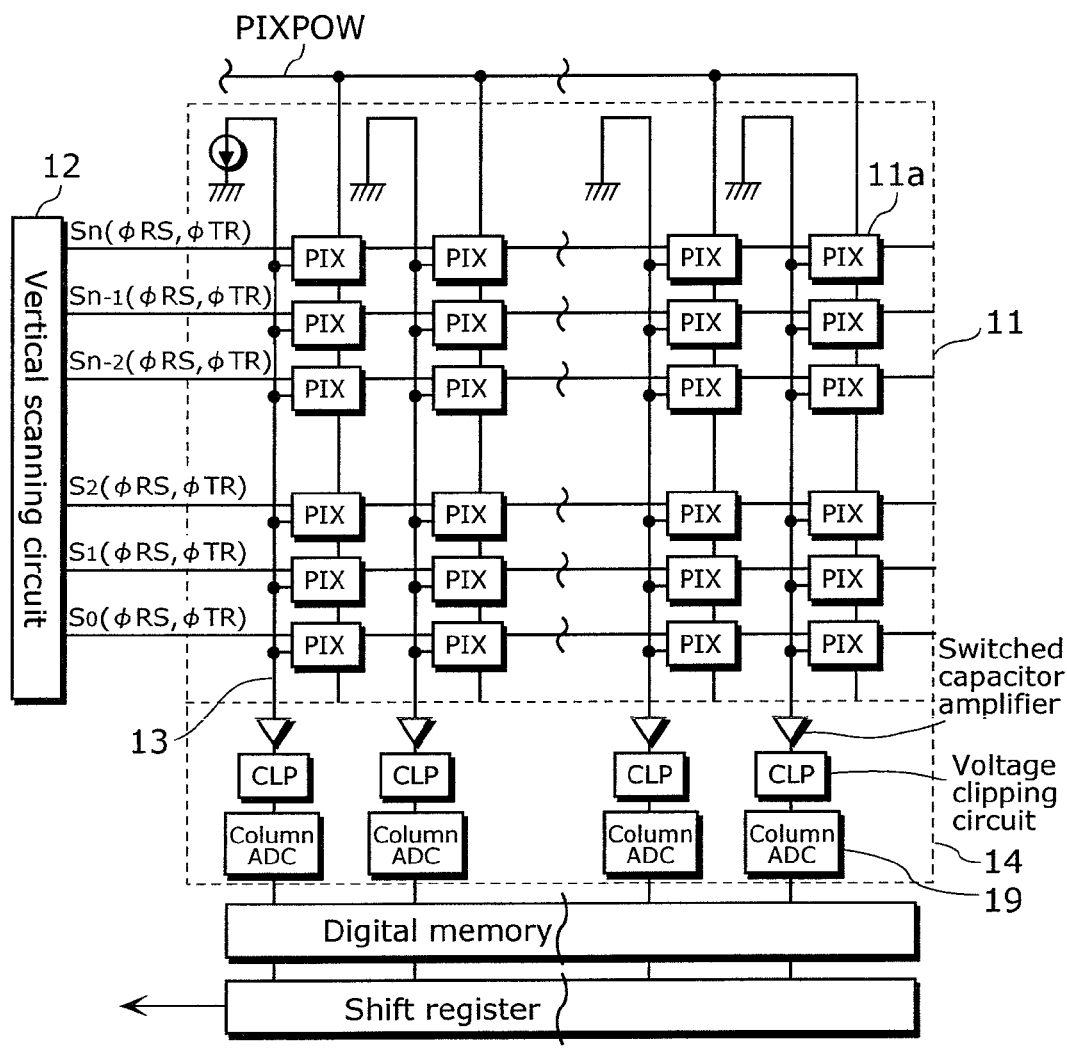
FIG. 11B is a block diagram showing a configuration of a variation of a solid-state imaging device according to the first embodiment.

In addition, as shown in the block diagram in FIG. 11B, the column amplifier circuit 14 in the solid-state imaging device according to the first embodiment may include a column analog-digital converter (ADC). In this case, it is possible to prevent a bit error caused by the current variation in the column ADC 19 by suppressing the consumption current of the column amplifier circuit.

Second Embodiment

The MOS solid-state imaging device according to the second embodiment includes a column amplifier circuit having a structure different from the solid-state imaging device according to the first embodiment, and includes the pixel circuit (pixel array) 11, the vertical scanning circuit 12, the vertical signal lines 13, the column CDS circuits 15, the horizontal scanning circuit 16, the horizontal common signal line 17, the output amplifier circuit 18 and the column amplifier circuits 24. The output of the column amplifier circuit 24 which is configured of the voltage clipping circuit and the switched capacitor amplifier is connected to the column CDS circuit 15, and output signals are sequentially read out to the horizontal common signal line 17 using the selection signals from the horizontal scanning circuit 16.

Figure 12:
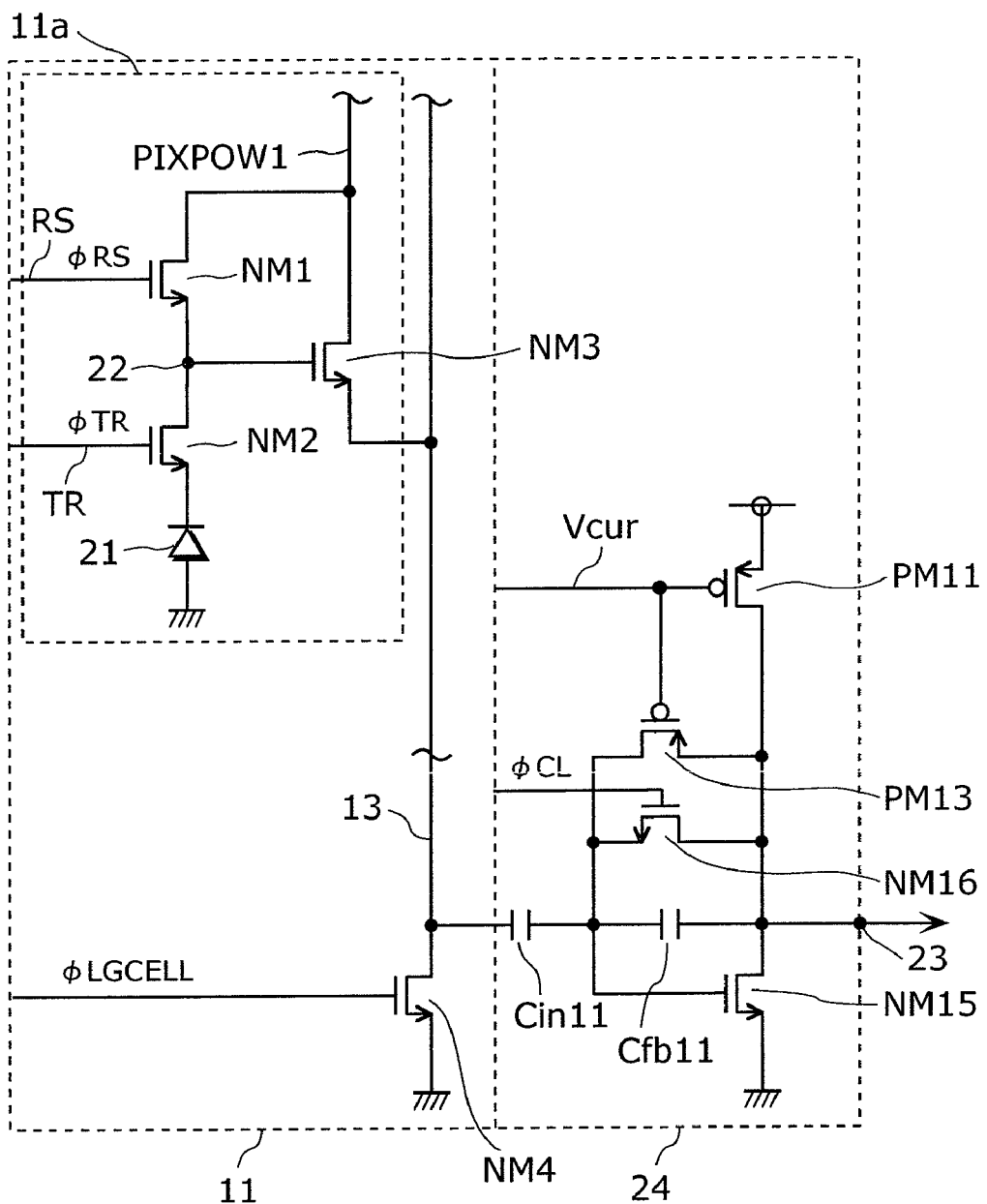
FIG. 12 is a circuit diagram showing a detailed structure of a pixel circuit and a column amplifier circuit of the solid-state imaging device according to the second embodiment.

FIG. 12 is a circuit diagram showing detailed structures of the pixel circuit 11 and the column amplifier circuit 24 according to the second embodiment of the present invention.

As shown in FIG. 12, the pixel circuit 11 is configured of the pixel 11a, the vertical signal line 13 and the current source load transistor NM4. Furthermore, the pixel 11a includes a photodiode (PD) 21 which generates signal charges corresponding to intensity of incident light and accumulates the signal charges, and a floating diffusion (FD) 22 which accumulates the signal charges transferred from the PD 21. The transfer transistor NM2 is provided between the PD 21 and the FD 22, and the reset transistor NM1 is provided between the FD 22 and the power source signal line PIXPOW1. In addition, the gate of the transfer transistor NM2 is connected to the transfer signal line TR, and the gate of the reset transistor NM1 is connected to the reset signal line RS. The FD 22 is connected to the gate of the amplifier transistor NM3 connected between the vertical signal line 13 and the power supply signal line PIXPOW1. In addition, the amplifier transistor NM3 forms a source follower circuit along with the current supply load transistor NM4 connected to the vertical signal line 13, and outputs signal voltage corresponding to the signal charge transferred from the PD 21 to the FD 22, to the vertical signal line 13. The column amplifier circuit 24 including: the input capacitance Cin11 having a capacitance value Cin; the feedback capacitance Cfb11 having a capacitance value Cfb; the common-source amplifier transistor NM15; the current source transistor PM11; the clamp transistor NM16; and the clipping transistor PM13 is connected to the vertical signal line 13. The clipping transistor PM13 is an example of voltage clipping circuit according to the present invention, and is a MOS transistor which limits the maximum output voltage of the column amplifier circuit 24. The circuit which includes the input capacitance Cin11, the feedback capacitance Cfb11, the common-source amplifier transistor NM15, and the current source transistor PM11, are examples of the switched capacitor amplifier according to the present invention.

A terminal on one end of the input capacitance Cin11 is connected to the vertical signal line 13. The feedback capacitance Cfb11 is inserted between the terminal on the other end of the input capacitance Cin11 and the output terminal 23 of the column amplifier circuit 24. The current source transistor PM11 is an example of the first current source transistor according to the present invention, and its drain is connected to the output terminal 23 of the column amplifier circuit 24, and its source is connected to the constant potential (power supply). In the common-source amplifier transistor NM15, the drain is connected to the output terminal 23 of the column amplifier circuit 24 and the source is grounded. In the clipping transistor PM13, the source is connected to the output terminal 23 of the column amplifier circuit 24, the drain is connected to the gate of the common-source amplifier transistor NM15, and the gate is connected to the signal line Vcas.

Here, the signal line Vcur is connected to the gate of the current source transistor 11, the reference voltage Vcur is applied, and the current source transistor PM11 operates in the saturation region. In addition, the signal line Vcur to which the gate of the current source transistor PM11 is connected is connected to the gate of the clipping transistor PM13 and the reference voltage Vcur is applied. The closed loop gain Ac of the column amplifier circuit 24 can be represented as follows using the parasitic capacitance Cp of the gate of the common-source amplifier transistor NM15 and the open loop gain A0.

$$Ac = \frac{Cin}{\left(Cfb + \frac{Cin + Cfb + Cp}{A_0}\right)} \quad \text{[Formula 10]}$$

When the open loop gain A0 is infinite, the closed loop gain Ac is represented as follows.

$$Ac = \frac{Cin}{Cfb} \quad \text{[Formula 11]}$$

As described above, the solid-state imaging device shown in FIG. 12 according to the second embodiment includes the column amplifier circuit 24 configured of a single ended switched capacitor amplifier and the clipping transistor PM13 in the same manner as described in the first embodiment.

In the solid-state imaging device having the configuration described above, first, signals corresponding to the intensity of incident light from the selected pixels 11a among the pixels 11a arranged in matrix are outputted to the vertical signal lines 13 provided corresponding to the columns of the pixels 11a. Next, the signals outputted to the vertical signal lines 13 are amplified by the column amplifier circuits 24 respectively connected to each of the vertical signal lines 13, and are outputted to the horizontal common signal line 17. When the signals are outputted from the column amplifier circuit 24, the maximum output voltage is limited by the clipping transistor PM13 provided in the column amplifier circuits 24.

Next, operations of the pixel circuit 11 and the column amplifier circuit 24 of the solid-state imaging device according to the second embodiment are described with reference to the timing chart of FIG. 8.

First, at timing between t1 and t2, the FD 22 in the pixel circuit 11 is reset to the voltage of the power source signal line PIXPOW1. At the same time, the clamp transistor NM16 in the column amplifier circuit 24 is switched on to reset the column amplifier circuit 24. Next, at timing t3, the reset is released by switching off the clamp transistor NM16. Next, at timing between t4 and t5, the transfer transistor NM2 in the pixel circuit 11 is switched on to transfer the signal charge Q accumulated in the PD 21 is transferred to the FD 22. The signal charge Q is Q-V converted by the capacitance Cfd in the FD 22, and the following signal amplitude is outputted to the vertical signal line 13.

$$\frac{Q}{Cfd} \quad \text{[Formula 12]}$$

The column amplifier circuit 24 outputs the following signal amplified by Ac times with respect to the output signal from the vertical signal line 13.

$$Ac \times \frac{Q}{Cfd} \quad \text{[Formula 13]}$$

Note that the gain in the source follower circuit formed when outputting signals from the pixel 11a is assumed to be 1.

Next, the voltage clipping unit in the column amplifier circuit 24 according to the second embodiment is described. The same chart as the first embodiment, representing the relationship between the signal amplitude Vin and the consumption current Iamp of the column amplifier circuit 24 applies to the second embodiment, and thus description is made with reference to FIG. 9.

As shown in the dotted line in FIG. 9, when there is no clipping transistor PM13, the consumption current drastically falls when a signal having signal amplitude larger than the signal amplitude Vmax is inputted to the column amplifier circuit. This is due to, as described above, the operation of the current source transistor PM11 in the non-saturation region. Thus, in the solid-state imaging device according to the second embodiment, the consumption current shown in the solid line can be achieved by adding the clipping transistor PM13.

Here, the operation condition for the current source transistor PM11 in the saturation region is satisfied when the output voltage Vout of the column amplifier circuit satisfies the following using the threshold voltage Vtp of the current source transistor PM11.

$$Vout \leq Vcur - Vtp \quad \text{[Formula 14]}$$

Thus, when the output voltage Vout is the value shown below by applying Vcur, which is the gate voltage of the current source transistor PM11 to the gate of the clipping transistor PM13, $$Vout > Vcur - Vtp \quad \text{[Formula 15]}$$

the potential difference Vgs between the gate and the source of the clipping transistor PM13 is represented as:

$$|Vcas - Vout| > |Vtp| \quad \text{[Formula 16]}$$

The clipping transistor PM13 is conducted for the first time, and resistance is fed back to the column amplifier circuit. This feedback resistance prevents the output voltage Vout from being larger than Vcur−Vtp, and thus the current source transistor PM11 does not enter the non-saturation region. As a result, it is possible to suppress the variation in consumption current in the column amplifier circuit.

As described above, according to the second embodiment, it is possible to realize a constant current column amplifier circuit capable of using the maximum output voltage range of the amplifier circuit while suppressing the increase in the layout area with a simple circuit structure as in the first embodiment, and suppress the horizontal belt-like noise that is generated according to whether or not the signal of the high brightness object exist in other columns which has been read out simultaneously in parallel processing.

Furthermore, as described above, the solid-state imaging device according to the second embodiment is configured to judge whether the output voltage of the column amplifier circuit 24 is to be clipped or not at Vgs (gate-source voltage) by the clipping transistor PM13 as described above. Thus, it is necessary to match Vth (threshold voltage) of the current source transistor PM11 and Vth (threshold voltage) of the clipping transistor PM23. Therefore, in consideration of variations in manufacturing of transistors, it is preferable that the gate width and the gate length of the clipping transistor PM23 to match the gate width and the gate length of the current source transistor PM11 respectively, and that the clipping transistor PM23 is arranged next to the current source transistor PM11 as close as possible and in such a manner that the layout direction (channel direction) matches.

Third Embodiment

Figure 13:
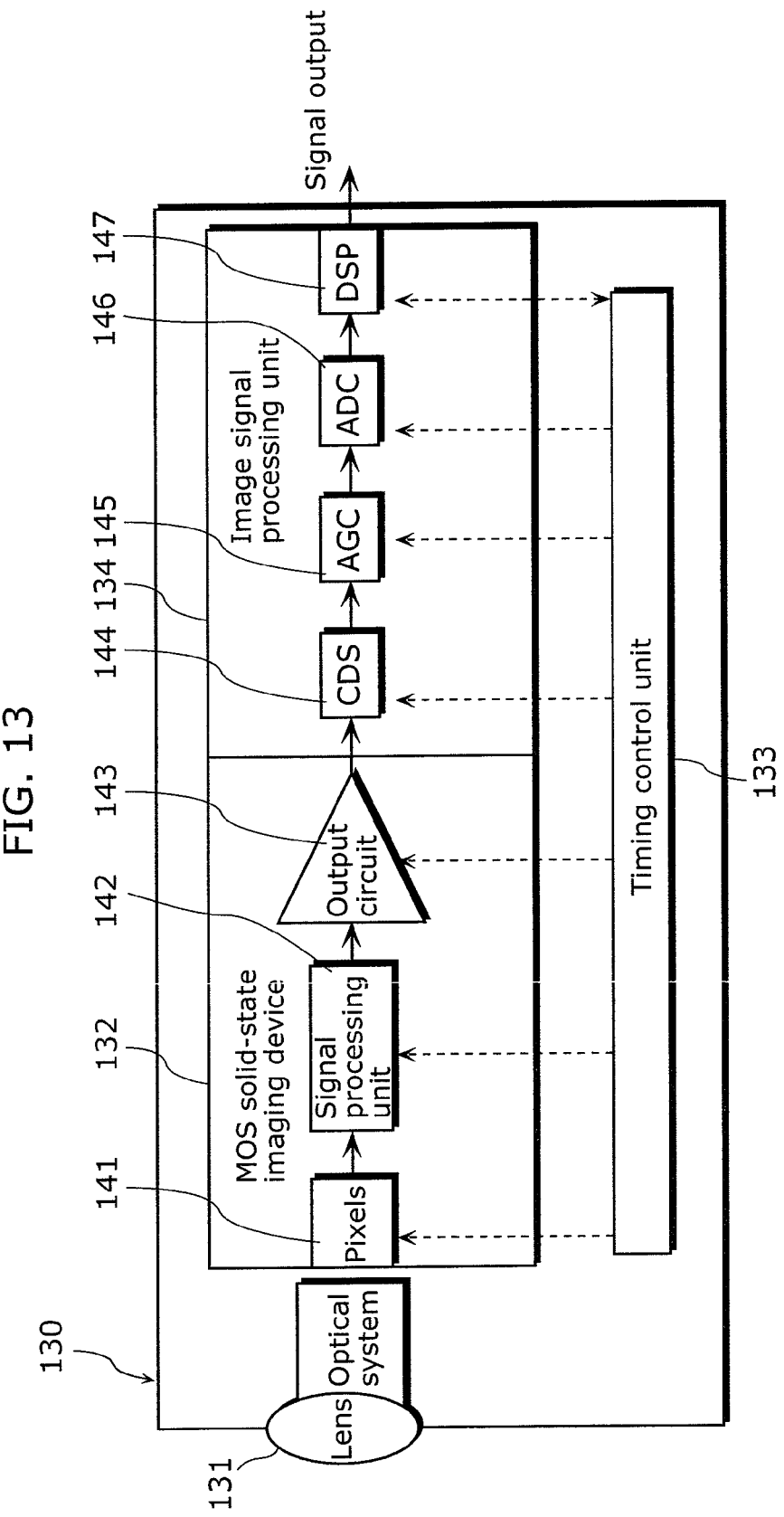
FIG. 13 shows a configuration of an imaging device (camera system) according to the third embodiment.

FIG. 13 shows a configuration of an imaging device (camera system) according to the third embodiment of the present invention.

As shown in the diagram, the imaging device 130 according to the third embodiment includes: an optical member (lens) 131 that collects external light; the MOS solid-state imaging device 132 according to the first or the second embodiment; the timing control unit 133 that controls operational timing of a circuit in the solid-state imaging device 132; and the image signal processing unit 134.

The solid-state imaging device 132 converts the light incident through the optical member 131 into image signals and outputs the converted image signals. The image signal processing unit 134 processes the image signals outputted from the solid-state imaging device 132 and outputs the signals to an external device such as a display device. Although the solid-state imaging device 132 and the image signal processing unit 134 are formed on the same semiconductor chip, however, they may be respectively formed on a separate semiconductor chip.

The solid-state imaging device 132 includes: the pixels 141 that convert incident light into voltage signals; the signal processing unit 142 that processes the signals outputted from the pixels 141; and the output circuit 143 that outputs the signals outputted from the signal processing unit 142 as the image signals. Each circuit in the solid-state imaging device 132 is identical to each circuit in the solid-state imaging device according to the first or the second embodiment. More specifically, the signal processing unit 142 includes a circuit configured of a vertical signal lines, column CDS circuits, a horizontal common signal line, and column amplifier circuits, and the output circuit 143 includes an output amplifier circuit.

The image signal processing unit 134 includes: the correlated double sampling circuit (CDS) 144 that receives image signals from the output circuit 143; the Auto Grain Control (AGC) 145, the Analog Digital Converter (ADC) 146; and the Digital Signal Processor (DSP) 147.

According to the imaging device of the third embodiment, it is possible to suppress horizontal belt-like noise generated in the signal processing unit that is generated according to whether or not the signal of the high brightness object exist in other columns which has been read out simultaneously in parallel processing when high luminance light enters the pixel 141. Furthermore, since a simple circuit structure can be realized, it is possible to reduce the size of the solid-state imaging device, and to reduce the size of the whole camera system.

Although only some exemplary embodiments of this invention have been described in detail above regarding the solid-state imaging device and a driving method thereof according to the present invention, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention is useful for a solid-state imaging device and its driving method, and is particularly useful, for example, for an amplifier circuit of the MOS solid-state imaging device.

What is claimed is:

1. A solid-state imaging device comprising:
   pixels arranged in a matrix and each of which outputs signals corresponding to intensity of incident light;
   vertical signal lines which are respectively provided to columns of the pixels and each of which transmits the signals from said pixels in a column direction; and column amplifier circuits that amplify the signals from the pixels and column Correlated Double Sampling CDS circuits, which are respectively connected to the vertical signal lines;

wherein each of said column amplifier circuits includes a voltage clipping circuit which limits a maximum output voltage of said column amplifier circuit, and an amplifier transistor whose drain is connected to an output terminal of the column amplifier circuit and whose source is grounded, and the voltage clipping circuit includes a clipping transistor whose source is connected to the output terminal of the column amplifier circuit, whose drain is connected to a gate of the amplifier transistor, and whose gate is connected to a reference potential.

2. The solid-state imaging device according to claim 1, wherein each of said column amplifier circuits includes a switched capacitor amplifier having:

an input capacitance, one terminal of which is connected to one of said vertical signal lines;

a feedback capacitance arranged between another terminal of said input capacitance and the output terminal of said column amplifier circuit; and a first current source transistor whose drain is connected to the output terminal of said column amplifier circuit and whose source is connected to a constant potential.

3. The solid-state imaging device according to claim 2, wherein a gate of said first current source transistor is connected to the reference potential to which the gate of said clipping transistor is connected.

4. The solid-state imaging device according to claim 2, wherein a gate width of said first current source transistor is approximately equal to a gate width of said clipping transistor.

5. The solid-state imaging device according to claim 2, wherein a gate length of said first current source transistor is approximately equal to a gate length of said clipping transistor.

6. The solid-state imaging device according to claim 1, wherein each of said column amplifier circuits includes a switched capacitor amplifier having:

an input capacitance whose one terminal is connected to one of said vertical signal lines;

a feedback capacitance arranged between another terminal of said input capacitance and the output terminal of said column amplifier circuit;

a first current source transistor whose drain is connected to the output terminal of said column amplifier circuit; and a second current source transistor whose drain is connected to a source of said first current source transistor and whose source is connected to a constant potential.

7. The solid-state imaging device according to claim 6, wherein a gate of said first current source transistor is connected to the reference potential to which the gate of said clipping transistor is connected.

8. The solid-state imaging device according to claim 7, wherein a gate width of said first current source transistor is approximately equal to a gate width of said clipping transistor.

9. The solid-state imaging device according to claim 8, wherein a gate length of said first current source transistor is approximately equal to a gate length of said clipping transistor.

10. The solid-state imaging device according to claim 9, wherein each of said column amplifier circuits includes a column Analog Digital Converter (ADC).

11. The solid-state imaging device according to claim 1, wherein each of said column amplifier circuits includes a column Analog Digital Converter (ADC).

12. An imaging apparatus comprising the solid-state imaging device according to claim 1.

13. A driving method for a solid-state imaging device comprising:

outputting signals corresponding to intensity of incident light from pixels, selected among pixels arranged in a matrix, to vertical signal lines which are respectively provided to columns of the pixels, and each of which transmits the signals from said pixels in a column direction;

amplifying the signals outputted to the vertical signal lines in column amplifier circuits which are respectively connected to the vertical signal lines, and outputting the amplified signals to a horizontal common signal line;

wherein in said amplifying, the signals are outputted while limiting a maximum output voltage of each of said column amplifier circuits by a voltage clipping circuit provided in each of the column amplifier circuits, wherein each of said column amplifier circuits includes an amplifier transistor whose drain is connected to an output terminal of the column amplifier circuit and whose source is grounded, and the voltage clipping circuit of the respective column amplifier circuit includes a clipping transistor whose source is connected to the output terminal of the column amplifier circuit, whose drain is connected to a gate of the amplifier transistor, and whose gate is connected to a reference potential.

* * * * *